No. 823,241.  
PATENTED JUNE 12, 1906.

L. E. WATERMAN.  
WHEELED PLOW.  
APPLICATION FILED JAN. 4, 1906.

Witnesses:  
C. B. Clark  
E. Behel

Inventor:  
Lewis E. Waterman.  
By A. O. Behel  
Atty.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

WHEELED PLOW.

No. 823,241.   Specification of Letters Patent.   Patented June 12, 1906.

Application filed January 4, 1906. Serial No. 294,642.

*To all whom it may concern:*

Be it known that I, LEWIS E. WATERMAN, a citizen of the United States, residing at Rockford, in the county of Winnebago and State of Illinois, have invented certain new and useful Improvements in Wheeled Plows, of which the following is a specification.

The object of this invention is to form a connection between the main frame of a wheeled plow and the front furrow-wheel in order that the forward end of the main frame may be raised and lowered to control the vertical movements of the plow or plows carried by the main frame.

Figure 1:
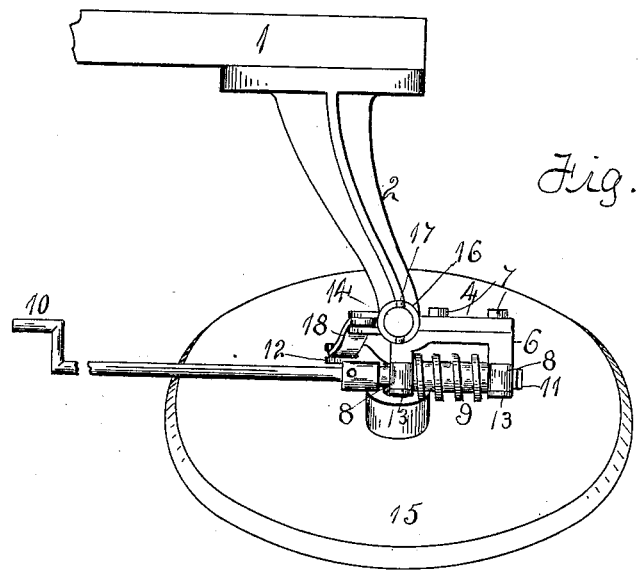
Figure 2:
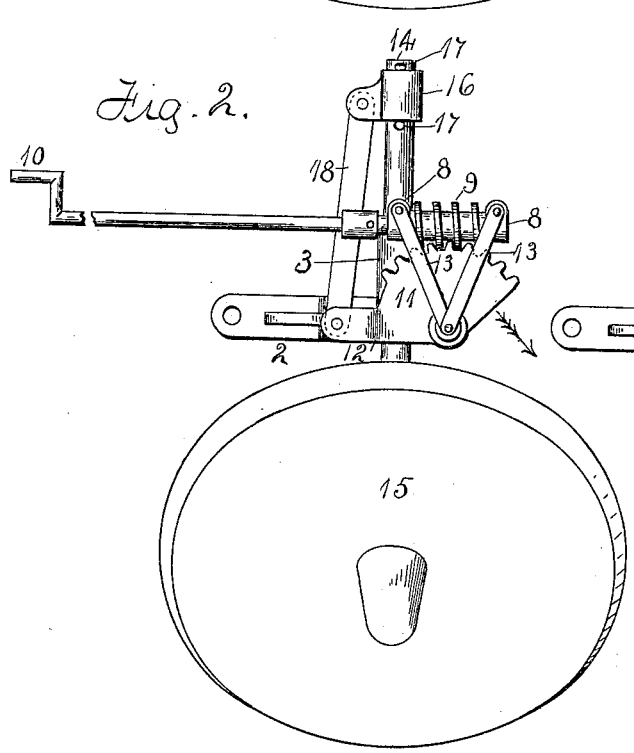
Figure 3:
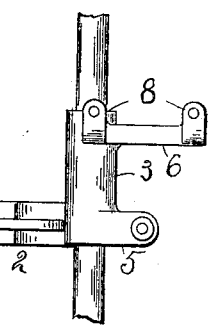

In the accompanying drawings, Figure 1 is a plan view of the forward end of the main frame of a wheeled plow and the front furrow-wheel, showing my improvements. Fig. 2 is an elevation. Fig. 3 is an elevation of the bracket supporting the worm and worm-wheel.

In the drawings I have shown only the forward portion of the main frame of a wheeled plow to which my improvements are connected.

To the forward end of the main frame 1 is secured a bracket 2, which is provided with a vertical tubular section 3.

From the upper portion of the vertical tubular section 3 extends an arm 4, and from the lower portion extends a support 5.

To the arm 4 is secured a bracket 6 by the bolts 7. This bracket has two ears 8 extending from it.

A worm 9 is supported by the ears 8 and is rotated by the crank 10 connected therewith.

To the support 5 is pivoted a segmental worm-wheel 11, which is located in engagement with the worm 9. From the segmental worm-wheel 11 extends an arm 12. Two brace-bars 13 connect the ears 8 with the support 5.

The vertical tubular section 3 supports a shaft 14 in a manner to permit the section to slide thereon in its lengthwise direction. The lower end of this shaft 14 supports a front furrow-wheel 15. The upper end of the shaft 14 has a collar 16 located around it, which is held in position by the pins 17, one located at either end of the collar.

A link 18 has its upper end pivotally connected to the collar 16, and its lower end is pivotally connected to the arm 12, extending from the segmental worm-wheel.

By means of the crank 10 the worm 9 is revolved in one direction, which will turn the segmental worm-wheel on its pivotal connection with the support 5 in the direction indicated by the arrow, which will cause the forward end of the main frame of the plow to be depressed. A reverse movement of the worm will cause the segmental worm-wheel to move in the opposite direction, which will elevate the forward end of the main frame.

The forward end of the main frame will be held at any point of its adjustment by reason of the worm acting as a stop to the movement of the segmental worm-wheel.

I claim as my invention—

The combination of the forward portion of a wheeled plow, a bracket secured thereto having a vertically-arranged opening, a front furrow-wheel having a shaft portion located in the opening, a worm and segmental worm-wheel in mesh and supported by the bracket, a link connection between the segmental worm-wheel and upper portion of the shaft, and means for rotating the worm.

LEWIS E. WATERMAN.

Witnesses:
A. O. BEHEL,
E. BEHEL.